United States Patent
Rennerfelt

[11] Patent Number: 5,913,744
[45] Date of Patent: Jun. 22, 1999

[54] ECCENTRIC GEAR

[76] Inventor: Gustav Rennerfelt, Nilstorpsvägen 53, Lidingö, Sweden, S-181 47

[21] Appl. No.: 08/776,923

[22] PCT Filed: Jul. 10, 1995

[86] PCT No.: PCT/SE95/00815

§ 371 Date: Feb. 11, 1997

§ 102(e) Date: Feb. 11, 1997

[87] PCT Pub. No.: WO96/05451

PCT Pub. Date: Feb. 22, 1996

[30]     Foreign Application Priority Data

Aug. 12, 1994 [SE] Sweden ................................. 9402701

[51] Int. Cl.$^6$ .......................................................... F16H 1/32
[52] U.S. Cl. ........................... 475/163; 475/162; 475/177
[58] Field of Search ..................................... 475/162, 163, 475/180, 168, 176, 177

[56]              References Cited

U.S. PATENT DOCUMENTS

| 4,760,759 | 8/1988 | Blake ................................. 475/180 X |
| 4,770,062 | 9/1988 | Minegishi ........................... 475/162 X |
| 4,843,911 | 7/1989 | Minegishi et al. .................. 475/162 X |
| 4,994,005 | 2/1991 | Rennerfelt ............................. 475/162 |
| 5,030,184 | 7/1991 | Rennerfelt ............................. 475/162 |
| 5,232,412 | 8/1993 | Zheng et al. ........................... 475/162 |
| 5,704,865 | 1/1998 | Rennerfelt ......................... 475/162 X |

*Primary Examiner*—Dirk Wright
*Assistant Examiner*—Peter T. Kwon
*Attorney, Agent, or Firm*—Terrance L. Siemens

[57]                  ABSTRACT

An eccentric gear comprises two differently large gear rings (6, 7), of which an outer ring (6) has a certain number of inwardly directed teeth and an inner ring (7) has a smaller number of outwardly directed teeth, of which only a few engage with the outer gear ring, in that the inner gear ring is eccentrically mounted in bearings. The inner gear ring (7) is integrated with a casing part (8) whose geometrical axis of rotation (A) is oblique relative to an axis of symmetry (B) through the center of the outer gear ring (6). During the generation of the inner gear ring, the casing part is submitted to a nutating motion, during which the axis of rotation (A) of the casing part moves as a generatrice along an imaginary cone, around a cone apex (C) that is axially distanced from the gear rings (6, 7). In a region that is equally distanced from the gear rings as the cone apex (C), the casing part is associated with a gear ring (12) that is ready to be led into engagement with a complementary second gear ring on the driven element of an application object in order to, jointly with the latter, form a force transmitting unit situated substantially in a plane (D—D) extending perpendicularly to said axis of symmetry, in which plane the cone apex (C) is located.

7 Claims, 5 Drawing Sheets

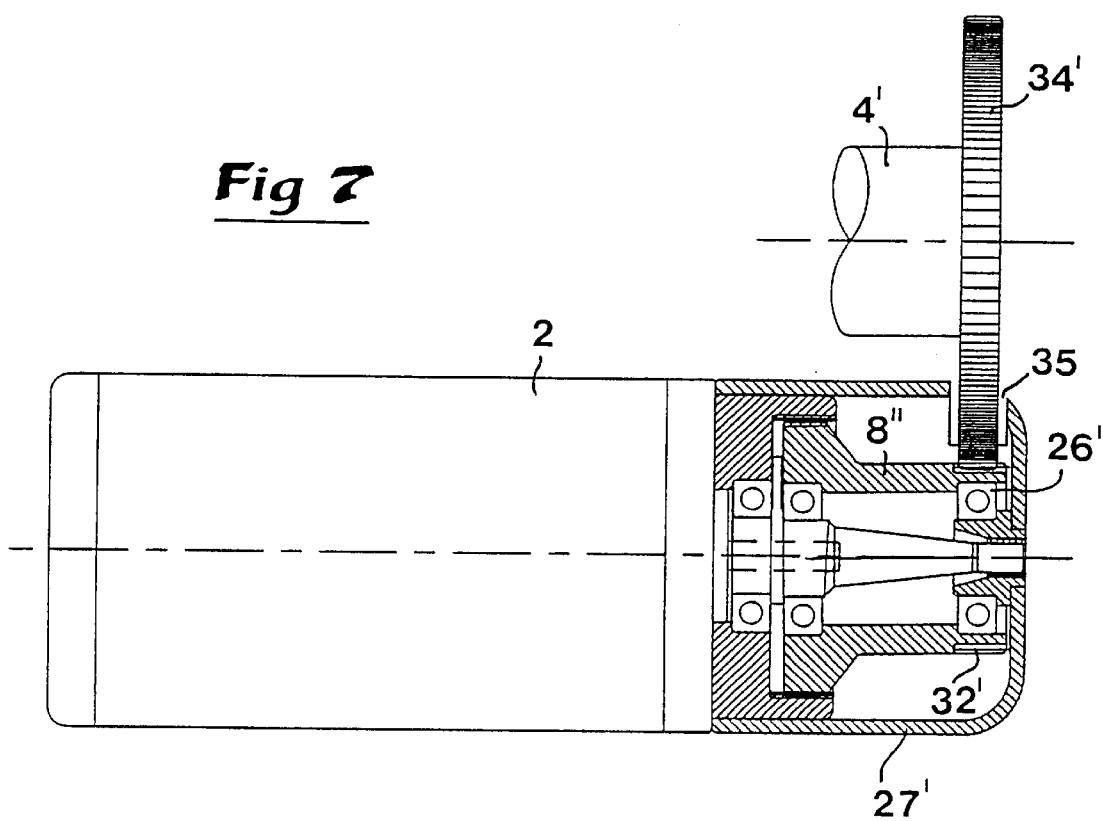
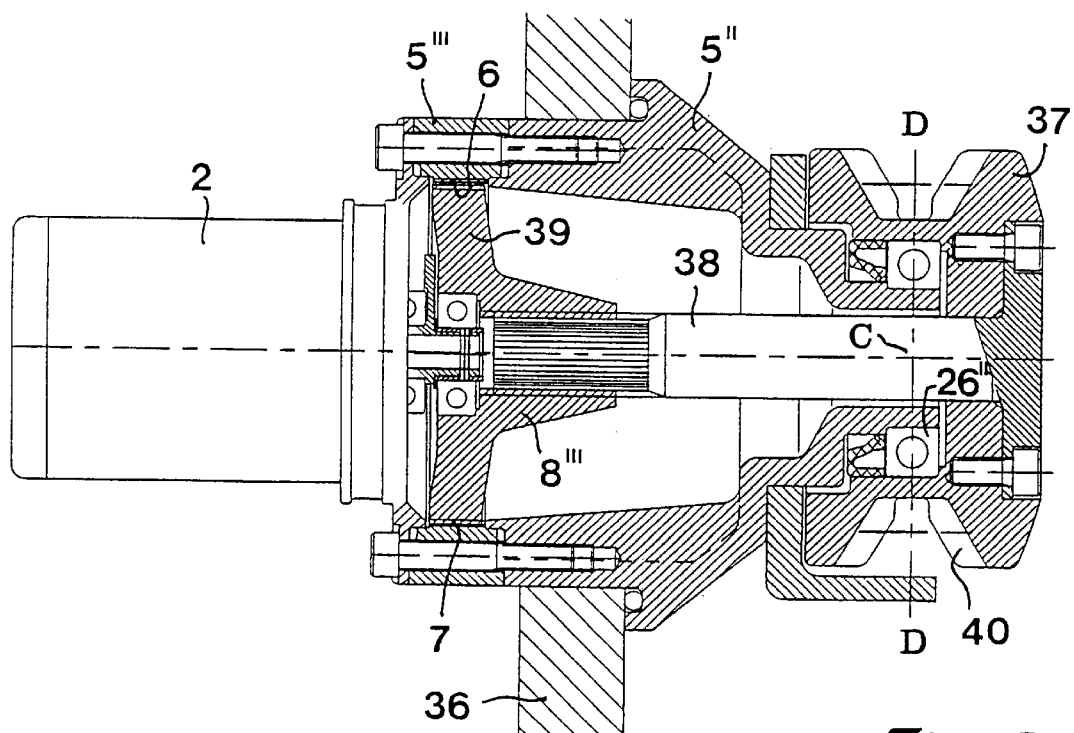

ECCENTRIC GEAR

TECHNICAL FIELD OF THE INVENTION

This invention relates to an eccentric gear for transmitting a torque or force from an input or driving, rotatable element to a driven element comprising two cooperating gear rings with differing pitch diameters, of which a first, outer gear ring with the largest diameter has a certain number of inwardly directed teeth and a second, inner gear ring has a smaller number of outwardly directed teeth of which only a minor number, e.g. one, is in engagement with the outer gear ring, in that the inner gear ring is mounted in bearings eccentrically relative to the outer one, the gear change between said driving and driven elements being dependent upon the total number of teeth in each gear ring.

PRIOR ART

Eccentric gears of the sort generally related to above are previously known in different embodiments. Thus, in SE 9203101-2 an eccentric gear is disclosed that is specially, although not exclusively, suitable for being used in industrial or other robots. In this case, the gear is delivered as an independent unit, which may be inserted between a driving source, for instance an electric motor, and a driven, rotating element of the robot or the application object in order to gear down a high rotation speed of an output shaft from the driving source to a lower speed of an input shaft that forms the driven element of the application object. An essential advantage of eccentric gears is that they in one single step make possible large gear change relations. Thus, in practice they manage gear changes in the range of 50:1 to 200:1. In comparison with other types of gears, in particular multiple gears, eccentric gears have a constructional simplicity that has been considered to offer an inexpensive solution to the generally occurring problem in mechanical engineering to attain large gear changes. However, such previously known eccentric gears that have been series-produced as independent or separate units for later application with the purchaser/user have had in common that they have always included both an input shaft or shaft part centrically mounted in bearings, and an output shaft or shaft part, likewise centrically mounted in bearings. The inner gear ring has then been provided on a ring- or disk-shaped body of a small axial extension, from which the down-geared rotary motion has been transferred to the output shaft via carrier mechanisms of a more or less complicated and thereby expensive nature. Each of the two shafts of the gear require not only a bearing, but also the installation space thereof; often in opposed ends of a more or less voluminous housing in which the tooth-carrying, eccentrically movable ring or disk body is built-in. Further, costly and space-demanding connections or couplings are required not only between the driving source and the input shaft of the gear but also between the output shaft of the gear and the driven rotary element comprised by the application object of the purchaser/user.

As a further example of an eccentric gear of the sort initially related to, the gear disclosed in U.S. Pat. No. 5,030,184 (Rennerfelt) may also be mentioned.

OBJECTS AND FEATURES OF THE INVENTION

The present invention aims at removing the above-mentioned shortcomings of previously known eccentric gears of the sort related to and providing a constructionally extremely simple gear. Thus, a primary object of the invention is to provide an eccentric gear that not necessarily requires any output shaft and the bearings belonging thereto and which therefore does not require expensive couplings between the gear and the application object for its connection to the application object in question. Further, it is an object of the invention to provide an eccentric gear that may be connected to an arbitrary application object in a simple way. Still another object of the invention is to accomplish an eccentric gear which for its function requires very few components and which therefore can be produced to a very low cost with the ultimate purpose of making the use of the gear possible in application areas where high costs are unacceptable. In accordance with a particular aspect, the invention aims at providing a gear that is capable of setting the driven element of the application object not only in rotary motion but, also in a simultaneous reciprocate, axial motion. In accordance with a further aspect, the invention also aims at providing a gear that, despite a simple construction, manages to transform a rotary motion from the gear into an exclusively reciprocate motion of the driven element of the application object.

According to the invention, at least the primary object is attained by means of providing an eccentric gear comprising two cooperating gear rings with differently sized pitched diameters. A first outer gear ring having a large diameter has a certain number of inwardly directly teeth and a second inner gear ring has a small number of outwardly directed teeth of which only a minor proportion are in engagement with the outer gear ring. The inner gear ring is mounted in bearings eccentrically relative to the outer gear ring. The gear change between the driving and driven elements are dependent upon the total number of teeth in each gear ring, the eccentric inner gear ring being in the form of separate unit being connectible to an arbitrary application object in which the driving element is included. The inner gear ring is connected with a rotatable, enlongated body whose geometrical axis of rotation is oblique relative to an imaginary geometrical axis of symmetry through the center of the outer gear ring in which during the generating motion of the inner gear ring against the outer gear ring is submitted to a rotating motion, during which the axis of rotation of the body moves as a generatrice along the surface of an imaginary cone apex. The body is positioned within a region substantially equally distanced from the gear ring and the cone apex, and is associated with a first engaging means which is adapted for engagement with a complimentary second engaging means appurtenant to the driven element of the application object, in order to jointly with this second means from a force transmitting unit substantially situated in a plane that is perpendicular relative to the axis of symmetry of the plane of the cone apex.

According to a particularly preferred embodiment, the elongated body on which the inner eccentrically movable gear rind is formed, has the shape of a casing or a casing-like part according to a further embodiment this casing part can be used for carrying a third gear ring intended to be brought into engagement with an analogous gear ring that constitutes a part of the driven element of the application object, said driven element forming a stationary part in the space that determines the position of the cone apex around which the casing part moves during its nutating motion.

FURTHER ELUCIDATION OF PRIOR ART

An eccentric gear mechanism with a tooth-carrying casing part exerting a nutating motion during use is previously known per se from WO 93/06999. However, in that case the gear mechanism in included as an integrated, internal component into a cylindrical roll, wherefore a separate arbitrary application object cannot be connected to the gear mechanism at all, and even less so in the simple way that characterizes the present invention.

BRIEF DESCRIPTION OF THE APPENDED DRAWINGS

In the drawings:

FIG. 1 is a longitudinal section of an eccentric gear according to the invention, which at its input side is shown connected to a motor and at its output side is connected to an application object comprising a valve spindle as the driven element, FIG. 2 is a longitudinal section of only the gear per se, FIG. 3 is an exploded view of the gear according to FIG. 2, FIG. 4 is a longitudinal section of a similar, although modified embodiment of the gear according to FIG. 1 to 3, FIG. 5 is a longitudinal section of an alternative embodiment of a gear in which the force transmission between the gear and a driven element of the application object is effected via a gear belt, FIG. 6 is an exploded view showing different details comprised by the gear according to FIG. 5, FIG. 7 is a longitudinal section corresponding to FIG. 5 showing an embodiment according to which the force transmission to the driven element is effected via a simple toothed transmission, FIG. 8 is a longitudinal section of a gear for force transmission to a driven element via a chain, FIG. 9 is a longitudinal section of a gear that transforms a rotary motion of a driving source into an axially reciprocating motion of a driven element, and FIG. 10 is a partly sectioned side view showing the use of the gear in connection with a wheel provided with a tire.

DETAILED DESCRIPTION OF PREFERRED EMBODIMENTS OF THE INVENTION

Figure 1:
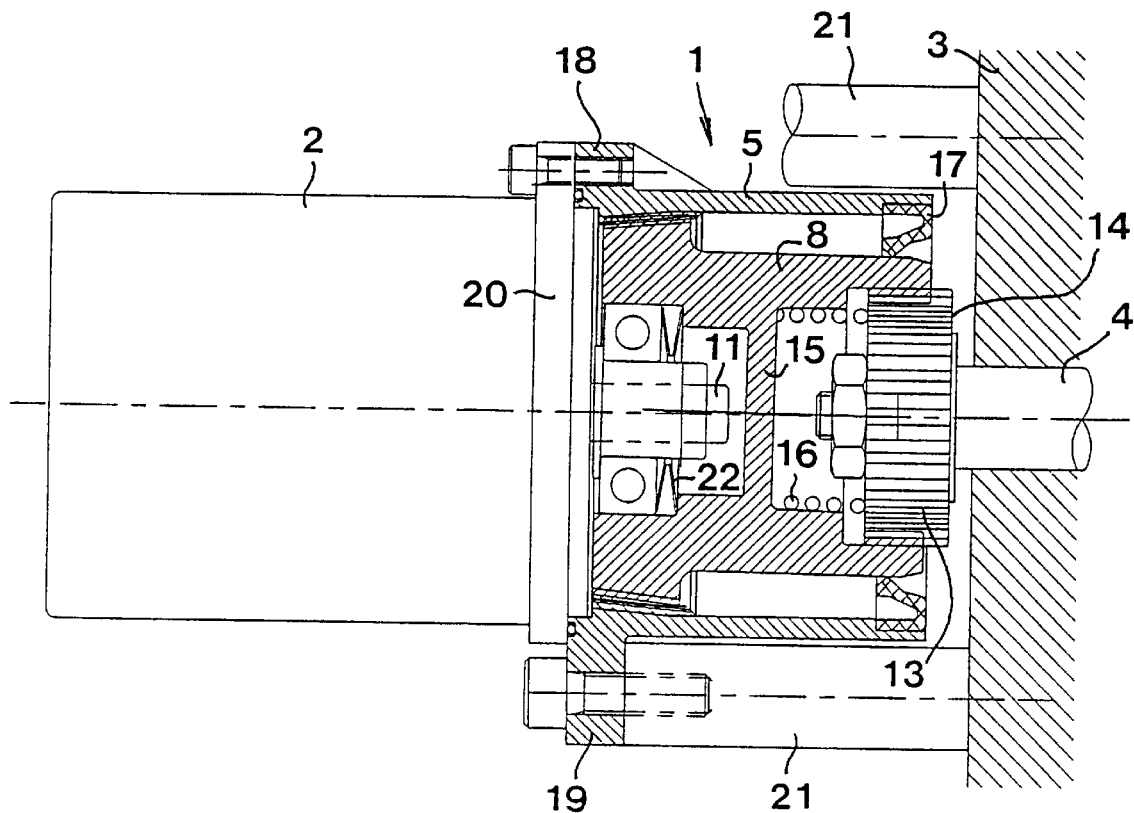
Figure 2:
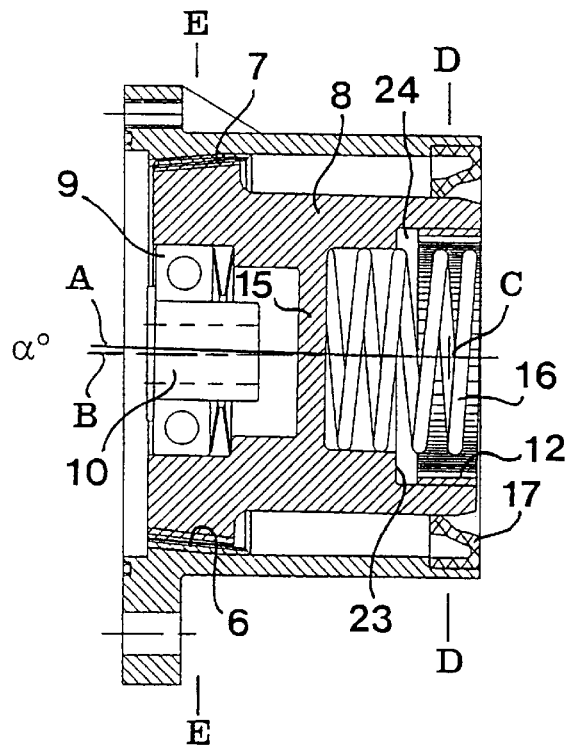
Figure 3:
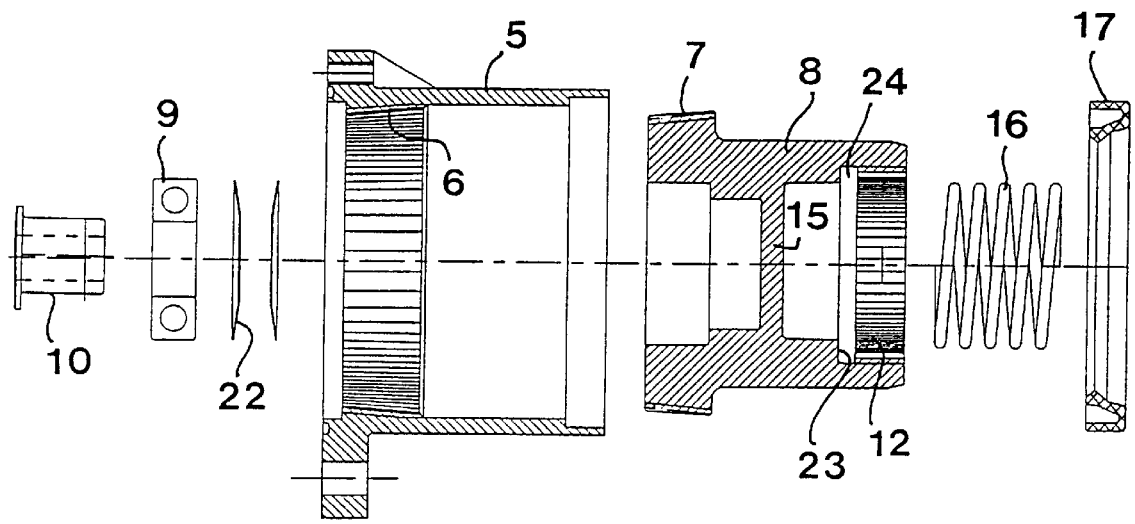

In FIG. 1 to 3, reference numeral 1 generally designates an eccentric gear made according to the invention, which gear at its input side is connected to a driving source in the form of a motor 2, for instance an electric motor. At its output side, the gear 1 is connected to an application object which is schematically shown at reference numeral 3. In the example this object is assumed to be in the form of a valve housing comprising a valve spindle 4 that is turn- or rotatable for the regulation of the appurtenant valve. In the case where the valve spindle 4 comprises a thread, it is also axially movable.

One component in the gear 1 consists of an outer frame-forming ring 5 which on its inside has a first gear ring 6 arranged to cooperate in a known manner with a second gear ring 7 on a rotatable body designated 8. The first outer gear ring 6 has a larger pitch diameter than the gear ring 7 and has a certain number of inwardly directed teeth, while the inner gear ring 7 has a smaller number of outwardly directed teeth of which only a minor number, for instance one, is in engagement with the outer gear ring 6, in that the inner gear ring is eccentrically mounted in bearings relative to the outer one. More precisely, the body 8 that carries the inner gear ring 7 at its one end is carried by a bearing 9, e.g. a ball bearing, that is arranged outside an eccentric body 10 which in turn is co-rotatively connected with a shaft 11 pertaining to the motor 2 and which is centrically mounted in the same in bearings. The eccentric body 10 forms the driving, rotatable input element of the eccentric gear, to which the shaft 11 is connectable. The gear change of the gear is dependent upon the total number of teeth in the two gear rings 6, 7. Presume that the number of teeth in the outer gear ring 6 amounts to 90 while the number of teeth in the inner gear ring 7 amounts to 89. When the shaft 11 and the eccentric body 10 rotate, then the inner gear ring 7 will generate on the outer gear ring 6 like a planet wheel and thereby turn around its axis of symmetry in the opposite direction of rotation relative to shaft 11, more specifically by 1 tooth pitch since the difference in numbers of teeth is 1. In order to make the inner gear ring 7 and, thereby, the body 11 rotate a whole revolution, the shaft 11 has to rotate 89 revolutions. In other terms, a gear change or a reduction in the number of revolutions of 89:1 is obtained.

The eccentric gear shown in FIG. 1 to 3 as described so far is substantially previously known.

According to the invention, the body 8 carrying the inner gear ring 7 is elongated and has in the example according to FIG. 1 to 3 the shape of a casing or casing-like part, which, at its end being distanced from the gear ring 7, has a first means that is ready to be connected or be brought into engagement with a complementary second means on the valve spindle 4, which constitutes the element driven by the gear. According to the shown example, said first engagement means consists of an internal third gear ring 12 that is connected or integrated with the free end portion of the casing part. The complementary engagement means on the valve spindle 4 consists of a cooperating fourth gear ring 13 with outwardly directed teeth, said ring being provided upon a disk-shaped body 14 which is corotatively connected with the valve spindle 4.

The casing part 8 has a geometrical axis of symmetry designated A (see FIG. 2) which is oblique relative to an imaginary geometrical axis of symmetry B through the centre of the outer gear ring 6. During the gear generation of the inner gear ring 7 against the outer gear ring 6, the casing part is submitted to a nutating or tilting motion during which its axis of symmetry A moves like a generatrice along an imaginary conical surface, more specifically around a cone apex designated C that is axially distanced by a considerable stretch from the gear rings 6, 7. In the example, each one of the gear rings 6, 7 has a conical basic shape with small ends and large ends. More specifically, the conicity is such that the small ends of the gear rings point into the same direction. Specifically in the shown example, they point in a direction towards the motor 2. It should be observed that the previously mentioned cone apex C is located in a plane designated D—D which extends substantially perpendicularly to the axis of symmetry B. The distance between this cross plane D—D and the cross plane designated E—E that extends perpendicularly to the axis of symmetry B and in which the gear rings 6, 7 are located, is substantially as large as the distance of the gear ring 12 to the plane E—E. In other words, the gear ring 12 is substantially located in the cross plane D—D.

Within the casing part 8 a shoulder 15 is arranged which according to the example has the form of an intermediate wall. Against this wall is placed the one end of a pressure spring 16, for instance a helical pressure spring, whose opposite end is placed against the tooth-carrying disk-body 14 being carried by the spindle shaft 4. The spring 16 has the purpose of always keeping the casing part 8 spring-tensioned in a direction towards the motor 2, more specifically for keeping the tooth/teeth of the inner gear ring 7 being engaged with analogous teeth on the outer gear ring 6 in a gap-free engagement with the latter. In this way, a distinct and silent force transmission is secured between the gear rings.

Necessary lubricating grease for the gear rings 6, 7 is enclosed by means of a radial seal 17, preferably a standard seal, which according to the example in FIG. 1 to 3 has the shape of a cross-sectionally V-shaped, elastic ring, e.g. of plastic or rubber. Similarly to the gear ring 12, the sealing ring 17 is located in the cross section D—D, The frame ring 5 has lugs 18, 19, a flange or similar means for fastening the gear 1 to, on one hand, the motor 2 and, on the other hand, the application object 3. More specifically, the lugs 18 allow a screw-fastening of the gear to a flange 20 on the motor 2, while the lugs 19 may be screwed to suitable connecting taps or means 21 which in turn are stiffly fastened to the application object 3. In its screw-fastened state as shown in FIG. 1, the frame ring is immovable in the space relative to both the motor 2 and the application object 3.

It should also be pointed out that a cup spring 22 operates between the bearing 9 and an internal shoulder in the casing part 8, with the purpose of keeping the bearing in place and lightly stressing the same axially in order to avoid any looseness.

The Function of the Eccentric Gear According to the Invention

As previously mentioned, the comparatively elongated casing part 8 will perform a nutating or tilting motion when the inner gear ring 7 makes a generating motion against the outer gear ring 6 in a way similar to a planet wheel. The size of the angle α that the axis of symmetry A forms with the axis of symmetry B is determined by on one hand the size of the eccentricity of the gear rings 6, 7 and on the other hand the distance between the cross planes E—E and D—D. At a small distance between these cross planes, a comparatively large angle α is required for a certain eccentricity. With increasing distance between the cross planes, the angle α may be reduced. In practice, the angle α may lie within the range of 0,1 to 3°, suitably 0,2 to 2° or preferably 0,3 to 1°. The axial length of the casing part 8 should amount to at least 50% of the diameter of the gear ring 7 and suitably more in order not to necessitate too large angles α.

Of course, during the nutating motion of the casing part 8 the inner gear ring 12 will obtain a slewing or tilting movement at its right, free end. However, since the gear ring in question is located in the cross plane D—D which is common to the cone apex C, said ring will not obtain any eccentrically or radially directed motion and the deflection of the axial movement component will be very limited. Therefore, it does not present any practical difficulties to absorb these motions in the tooth connection between on one hand the gear ring 12 and on the other hand the gear ring 13 associated with the valve spindle 4, for instance by making the teeth with a certain adapted play. It is also feasible to make the teeth with a certain curvature instead of making them completely straight. If the casing part 8 at the end that comprises the gear ring 12 is wholly or partly made of plastic or another plastic material, also a play-free elastic pre-stress may be obtained in the tooth engagement with the gear ring 13.

In FIG. 1 it should particularly be noted that the inner gear ring 12 on the free end portion of the casing part 8 has a width that is smaller than the width of the outer gear ring 13 on the disk body 14. Moreover, it should be noted that the inner edge of the gear ring 12 is located at a certain distance from a shoulder surface 23 in the casing part, whereby a gap 24 is created between the shoulder and the gear ring. By this shaping, the disk body 14 and the appurtenant gear ring 13 are free to move axially in both directions without the gear rings 13, 14 losing their meshing with each other and without the apex C of the cone changing its spatial position in relation to the fixed frame ring 5 and the valve housing 3, respectively. Thus, a valve spindle 4 with threads may also be connected with the gear without losing the axial mobility that is necessary for adjusting the valve in question into different regulating positions. It should be obvious that the gear attends to a gear reduction of the relatively high rotation speed and low torque to a reduced rotation speed or deflection of angle of rotation, these being dependent as a function of the factual gear change, and an increased torque of the valve spindle 4.

The advantages of the invention are evident. By the fact that the freely exposed gear ring 12 is available on the casing part 8, the gear may easily and quickly be connected to the valve spindle without the necessity of any special couplings of the kind that has been previously required between an output shaft mounted in bearings of the gear and the rotation element in question of the application object. Further, the described gear assumes a very simple construction, comprising extremely few components, namely substantially only the frame ring 5, the casing part 8, the bearing 9 and the eccentric body 10, and where appropriate, the spring 16 and the sealing 17. In other terms, the gear can be produced at a very low cost in comparison with previously known eccentric gears.

Figure 4:
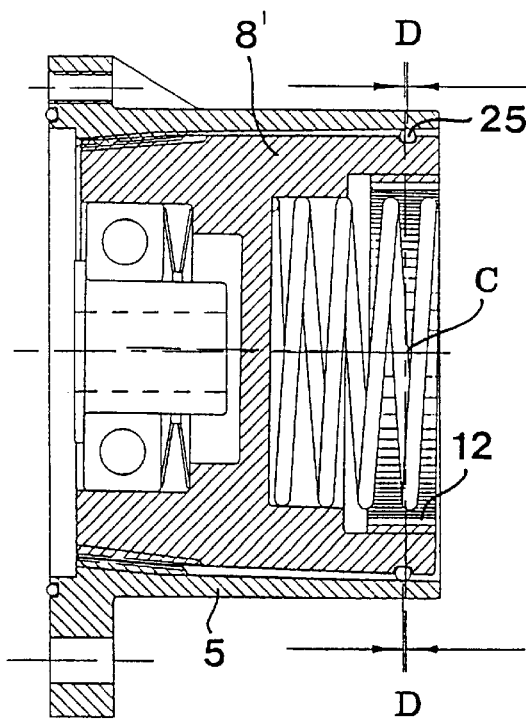

In FIG. 4 a modified embodiment is shown, according to which the V-shaped sealing ring 17 has been replaced by a simple O-ring 25. Also this sealing ring is located in the cross plane D—D in which the cone apex C of the casing part 8' is located. In FIG. 3 it is indicated how the gear ring 12 exerts slewing motions with restricted motion deflections under the nutating motion of the casing part. Thus, a major part of the upper portion of the O-ring is shown situated somewhat to the right of the cross plane D—D, while the major part of the lower portion is shown to the left of the same plane. The O-ring 25, which is relatively stiff in radial direction, simplifies the assemblage of the gear relative to the spindle. The cone apex C should be located on the axis of symmetry B in order to obtain the best possible contact between the gear rings 6 and 7.

Although the gear ring 12 related with the casing part is shown as an inner ring intended to be connected with an outer gear ring on the driven element of the application object, also the reversed relation is possible, i.e., an outer gear ring on the casing part and an inner gear ring on the driven element.

Figure 5:
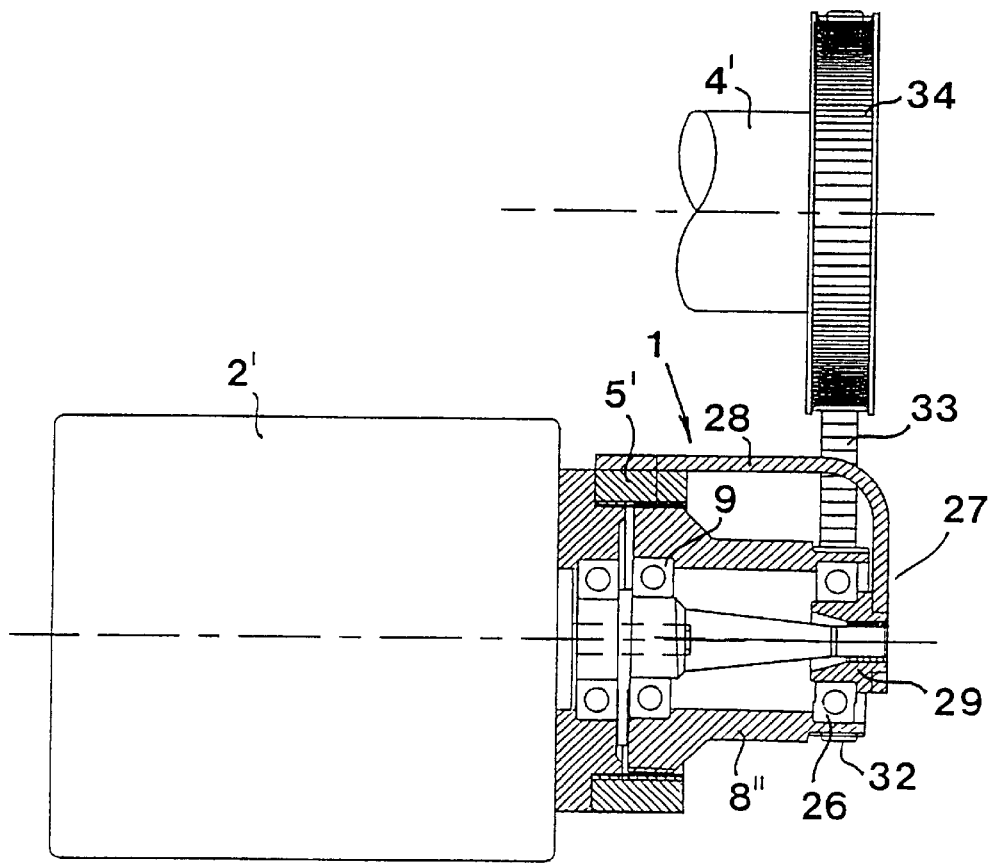
Figure 6:
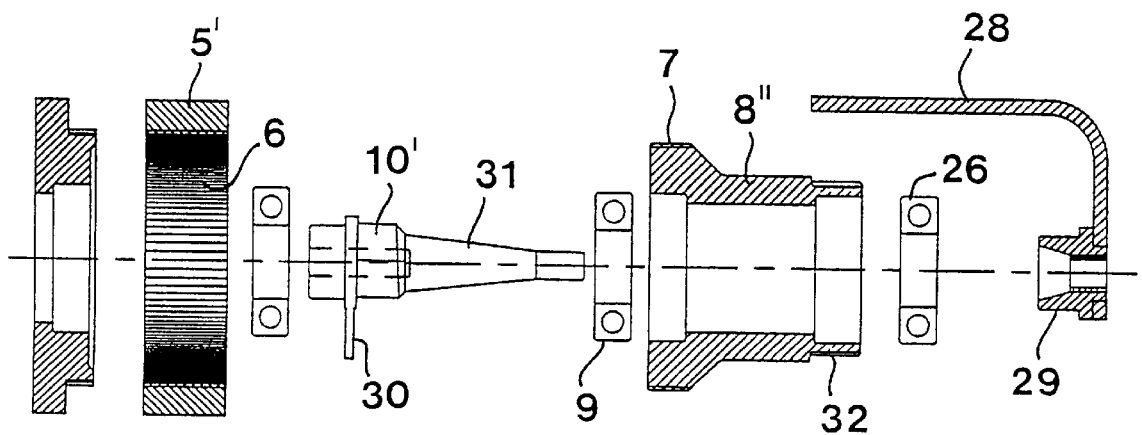

Reference is now made to FIG. 5 and 6 that illustrate an alternative embodiment according to which an element 4' driven by the gear 1 is indicated in the form of a shaft comprised by an arbitrary application object (not shown). The gear comprises a casing part 8", which is mounted in bearings not only by means of a first eccentrically placed bearing 9, but also by means of a centrically placed second bearing 26 at the free end of the casing part. This bearing is kept in place by means of a holder which is designated 27 in its entirety and which comprises an angle-shaped arm 28 being stiffly connected with a frame ring 5', and a support ring 29 being carried by said arm. The eccentric body 10', which in this case has a counter-weight 30, has an extension 31 whose free end is mounted in bearings in the support ring 29.

According to the embodiment of this example, the casing part 8", has an external fifth gear ring 32 which forms the first engaging or force-transmitting means of the gear. As may be seen in FIG. 5, the gear ring 32 engages with a gear belt 33 which in turn engages with a gear belt disk 34 on the driven shaft 4'.

Similar to the third gear ring 12 of the embodiment according to FIG. 1 to 3, the gear ring 32 is located in one and the same cross plane as the cone apex around which the casing part 8" exerts its nutating motion. Also in this case the gear ring 32 makes a slewing or tilting motion which, however, has a limited deflection, wherefore the resilient or flexible gear belt 33 manages to absorb the motions in question without any problems.

In FIG. 7 an embodiment is shown according to which the stationary holder 27' for the bearing 26' has the shape of a cover in which there is an opening 35 for a gear wheel 34' whose teeth are brought into direct engagement with the gear ring 32'. Thus, in the present case the other engaging means associated with the driven element 4' consists of the gear wheel 34' in lieu of the gear belt 33 as according to the embodiment of FIG. 5 and 6.

In FIG. 8 an embodiment is shown according to which the gear in question is formed for direct connection with a cable or chain transmission. In this case an outer, carrying frame ring 5" is fixedly attached to a carrier 36 of a suitable type. At its free outer end the frame 5" carries a bearing 26" on which a chain wheel or sprocket 37 is rotatably mounted, which in turn is co-rotatively connected with a shaft 38 that constitutes an extension of a casing part designated 8'". On its disk-shaped portion 39, this casing part carries an inner gear ring 7 which in a previously described manner cooperates with an outer gear ring 6 on the inside of a part-ring 5'" that is detachably connected with the frame ring 5". A motor 2 is connected with the gear. The wheel 37 has a toothing 40 for engaging with the chain in question. This toothing constitutes the first engaging means of the gear.

As according to the previous embodiments, said first engaging means 40 is located in the cross plane D—D in which the cone apex C as well as the bearing 26" are located. In this case the distance between the cross plane D—D and the cross plane for the gear rings 6, 7 is comparatively large (larger than the diameter of the gear ring 7), implying that the obliquity angle $\alpha°$ between the previously mentioned shafts A and B may be comparatively small. Thus, in the embodiment according to FIG. 8, it is feasible that this angle amounts to merely about 0,20–0,309°.

Figure 9:
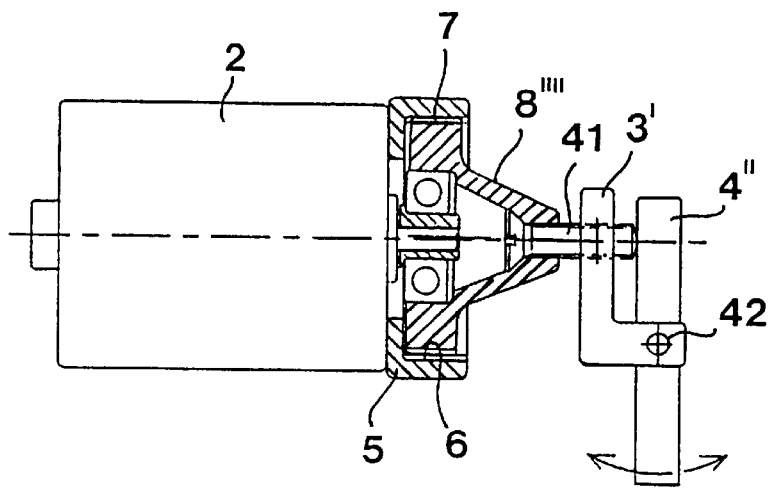

In FIG. 9 an eccentric gear is schematically illustrated, which has the purpose of transforming a rotary motion of an output shaft of a motor 2 into an axial, reciprocating motion of a driven element, e.g. in the form of a swivelling arm 4" to an application object 3' in the form of a stationary holder. In this case, a screw or screw-shaped tap 41 is co-rotatively connected with the casing part 8'", the external thread of said screw or screw-shaped tap being in engagement with an internal thread in a through-hole through the holder 3'. When the screw 41 is brought to rotate by means of the eccentric gear, with a speed of rotation that is reduced in comparison with the speed of rotation of the motor 2, then the screw 41 will—thanks to the thread engagement—be submitted to an axial motion which is directed either to the left or to the right on the drawing, depending on the direction of rotation of the casing part. In turn, this axial motion of the screw is transformed into a slowing motion of the arm 4" that is pivotable relative to the holder 3' via a joint designated 42. The screw tap 41 may either be fixedly connected with the casing part 8'" or be provided with splines. Then the casing part, and thereby the cone apex C, will be moved axially relative to the object 3'. This motion is usually small and can be accepted. Alternatively, the threaded tap 41 may constitute the application object and be provided with splines which engage into corresponding splines in the casing part 8"" (cf. FIG. 1).

Figure 10:
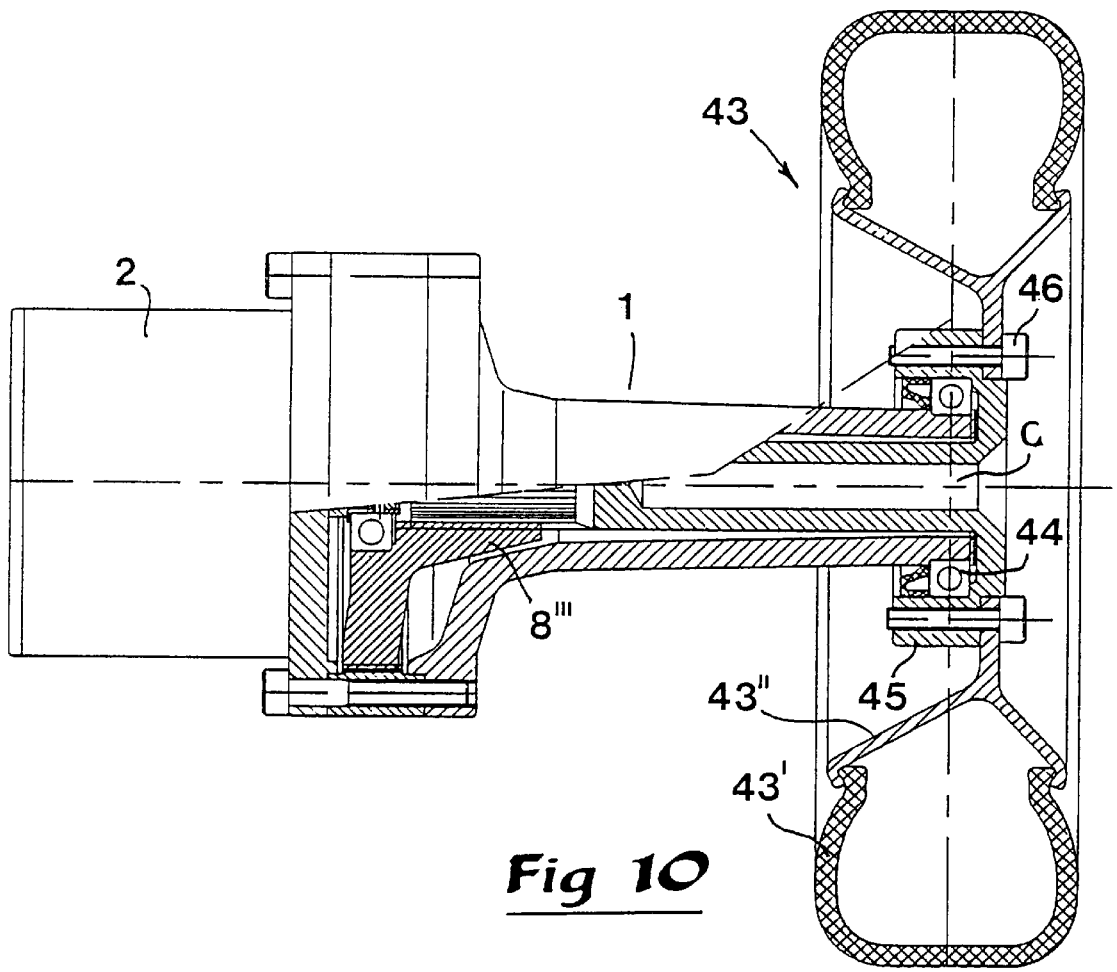

Eventually, in FIG. 10 an embodiment is shown according to which a gear 1 according to the invention has the purpose of transmitting a torque from a motor 2. e.g. a hydraulic motor, to a wheel 43 with a tire, which wheel comprises a rubber tyre 43' and a rim part 43". In conformity with the sprocket 37 according to FIG. 8, the wheel 43 is mounted in a bearing 44 which is located in the same cross plane as the cone apex of a nutating casing part 8'", in a previously described manner. By the lateral resilience of the tire, the tilting motions in question can be accepted. According to the example in FIG. 10, the rim part 43" forms the driven element of the application object, which element may be easily connected via a screw joint 46 with a ring flange 45 that is co-rotatively connected with the casing part 8'".

Feasible Modifications of the Invention

It is evident that the invention is not restricted merely to the embodiments as described and shown in the drawings. Thus, it is for instance feasible to make the first and second outer and inner gear rings, respectively, of the gear in another way than in the form of gear rings which both have a conical basic shape. Hence, the outer gear ring may, e.g., be cylindrical at the same time as the inner gear ring is conical. For simple gears with small requirements of accuracy, it is even feasible to make both gear rings substantially cylinder-shaped. Furthermore, it is feasible to make the teeth of at least one gear ring with a slight curvature, and it is also feasible to construct the teeth so that the contact points between the same extend helically and are distributed along several consecutive teeth or pairs of teeth. Although a casing-shaped part is preferred as an elongated, gear ring-carrying body, the body in question may also be formed in another way. Thus, as indicated in FIG. 8, the elongated body could also consist of a disk-shaped, tooth-carrying part and a central axial tap, being directly connected or integrated with the former. It should also be mentioned that according to the embodiment of FIG. 8, the wheel 37 may be modified in different ways in order to make possible the connection of the gear with other objects than just a chain. The wheel may for instance be formed for being connected with a transmission belt, e.g., a belt encompassed by a patient-lift, it being possible to effect the force transmission by a friction engagement between the wheel and the belt.

I claim:

1. An eccentric gear for transmitting (a) torque or (a) force from a rotatable drive element to a driven element, said driven element comprising two cooperating gear rings with differently sized pitch diameters, of which a first, outer gear ring with the larger diameter has a certain number of inwardly directed teeth and a second, inner gear ring has a smaller number of outwardly directed teeth, of which only a minor proportion is in engagement with the outer gear ring, and in that the inner gear ring is mounted in bearings eccentrically relative to the outer gear ring, the gear change between said driving and driven elements being dependent upon the total number of teeth in each gear ring, the eccentric inner gear ring being in the form of a separate unit being connectable to an arbitrary application object in which the driving element is included, such that the inner gear ring is connected with a rotatable, elongated body, whose geometrical axis of rotation is oblique relative to an imaginary geometrical axis of symmetry through the center of the outer gear ring and which during the generating motion of the inner gear ring against the outer gear ring is submitted to a rotating motion, during which the axis of rotation of the body moves as a generatrice along the surface of an imaginary cone the apex of which is axially distanced from the gear rings, and such that said body is substantially entirely within a region substantially equally distanced from the gear rings as said cone apex, and is associated with a first engaging means which is adapted for engagement with a complementary second engaging means appurtenant to the driven element of the application object in order to jointly with this second means form a force transmitting unit substantially situated in a plane that is perpendicular relative to said axis of symmetry, in which plane said cone apex is located.

2. An eccentric gear according to claim 1, wherein the first engaging means has the form of a third gear ring which is arranged at the end portion of the elongated body being distanced from the inner gear ring and intended to be brought into engagement with an analogous, fourth gear ring that makes part of the driven element of the application object and comprises said second engaging means, the driven element of the application object forming a part whose position is spatially determined and which determines the position of said cone apex.

3. An eccentric gear according to claim 2, wherein the teeth of the third gear ring have a smaller axial length than the corresponding teeth in the fourth gear ring in order to enable the third gear ring to move axially relative to the casing part without the gear rings losing their meshing with each other and without the cone apex changing its position relative to the application object.

4. An eccentric gear according to claim 2, wherein the first and second gear rings have a conical basic shape, with small ends and large ends and engage into each other with the small ends pointing in the same direction, and further including a fixed shoulder within the casing, serving as an intermediate wall, against which an end of a compression spring may abut, and whose opposite end may abut against the driven element of the application object, so that the spring in a compressed state biases the conical first and second gear rings into engagement with each other.

5. An eccentric gear according to claim 4, wherein the first outer gear ring is provided on the inside of a frame-forming ring which has means to connect the ring to the application object and to a motor, with an output shaft that is centrically mounted in bearings for driving an eccentric body that forms a driving element for the eccentric gear.

6. An eccentric gear according to claim 1, wherein the elongated body is mounted in bearings by a first, eccentrically placed bearing in the region of said second gear ring and by a second centrically placed bearing at the opposite end of the elongated body, which second bearing is kept in place by means of a stationary holder that determines the position for said cone apex, and that the elongated body in the region of the second bearing has an external, fifth gear ring, which forms said first engaging means and has the purpose of being led into engagement with a complementary second engaging means, in the form of a gear wheel, that is connected with the rotary element of the application object.

7. An eccentric gear according to claim 1, wherein an outer tap is included in the elongated body, which tap has an external thread which is in engagement with an internal thread in a hole in a fixed holder and which tap, when rotating, may be set in axial motion in both directions by said thread engagement, in order to influence an arm or a link.

\* \* \* \* \*